United States Patent [19]

Bauer et al.

[11] 4,443,057
[45] Apr. 17, 1984

[54] AUTOMATIC REARVIEW MIRROR FOR AUTOMOTIVE VEHICLES

[75] Inventors: Frederick T. Bauer, Holland; Jon H. Bechtel, Zeeland, both of Mich.

[73] Assignee: Gentex Corporation, Zeeland, Mich.

[21] Appl. No.: 268,660

[22] Filed: Jun. 1, 1981

[51] Int. Cl.³ .............................................. G02B 17/00
[52] U.S. Cl. .................................. 350/281; 250/214 B; 350/289
[58] Field of Search ............... 350/279, 280, 281, 282, 350/289; 250/214 D, 214 AL, 214 B

[56] References Cited

U.S. PATENT DOCUMENTS 3,601,614  8/1971  Platzer ........................... 250/214 B
3,612,666  10/1971  Rabinow ..................... 350/281 UX
3,680,951  8/1972  Jordan et al. ..................... 350/281
3,746,430  7/1973  Brean et al. ...................... 350/281

Primary Examiner—William L. Sikes
Assistant Examiner—Matthew W. Koren
Attorney, Agent, or Firm—Malcolm R. McKinnon

[57] ABSTRACT

An improved inside rearview mirror particularly adapted for use with automotive vehicles, the mirror incorporating improved means for detecting and comparing the relative brightness of light forwardly and rearwardly of the vehicle and improved means responding automatically to annoying glare from the rear of the vehicle to move a reflective element from a full reflective mode to a partial reflective mode and also automatically return the reflective element to a full reflective mode after the source of the annoying glare is removed.

44 Claims, 14 Drawing Figures

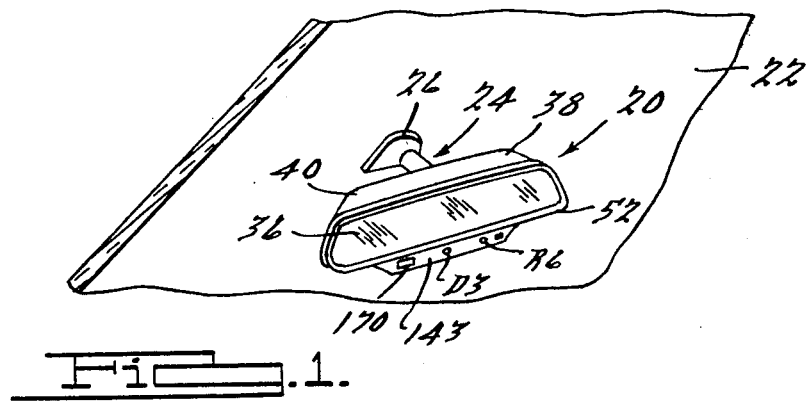
FIG. 1.
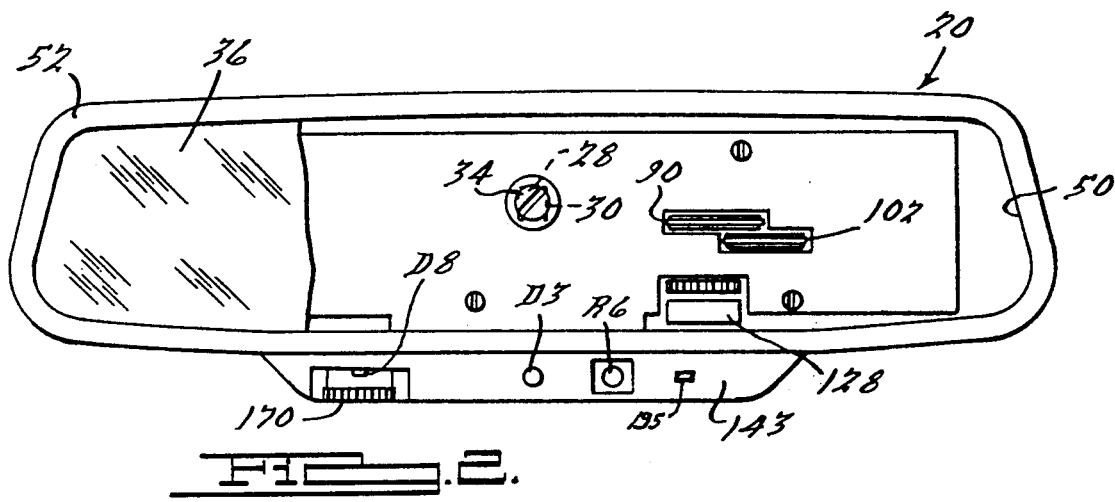
FIG. 2.
FIG. 6.

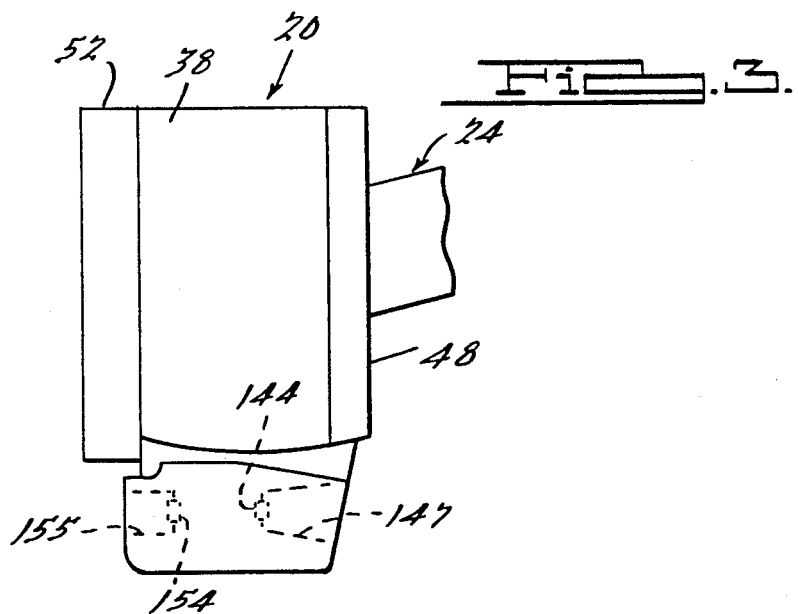
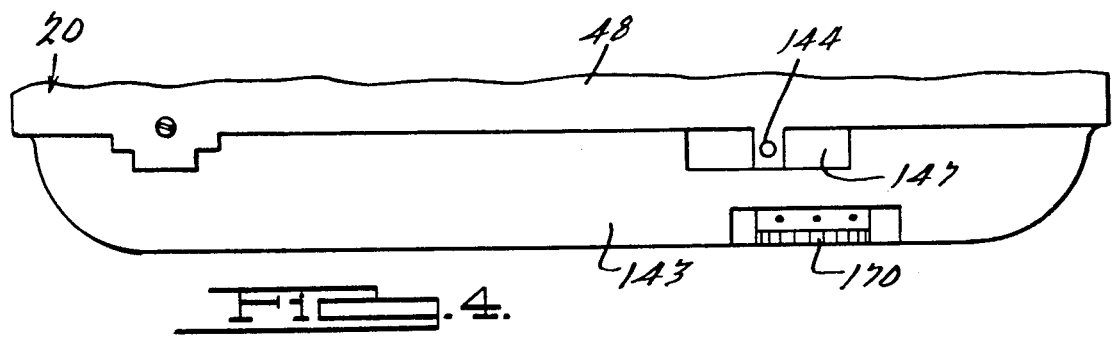
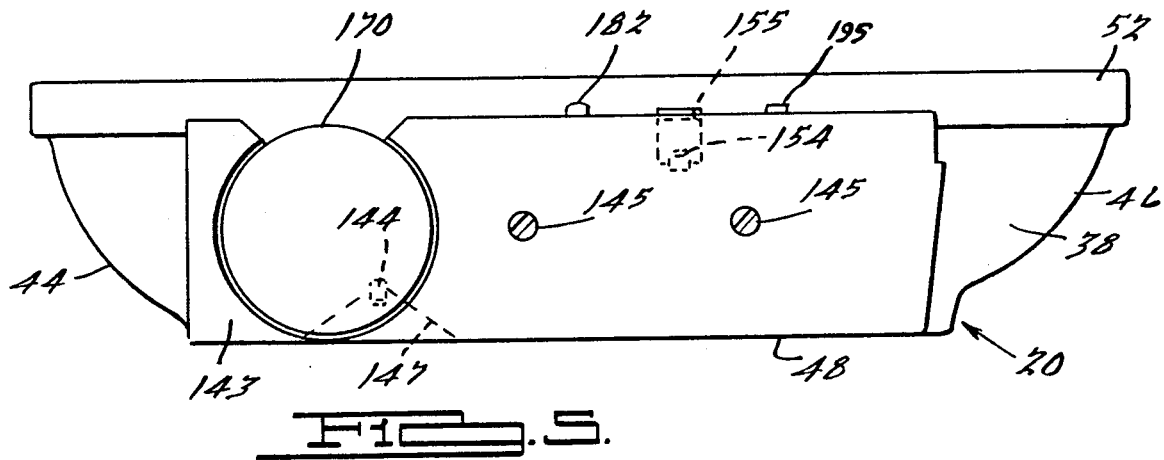

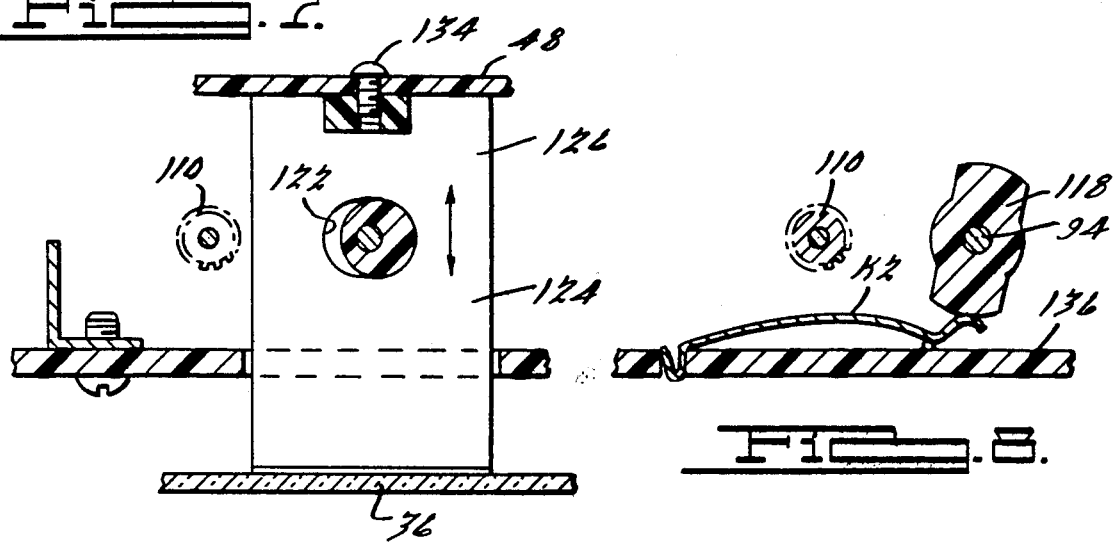
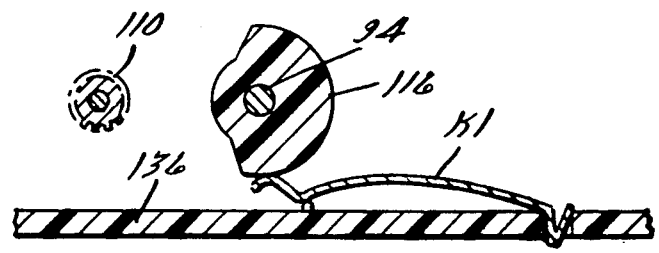
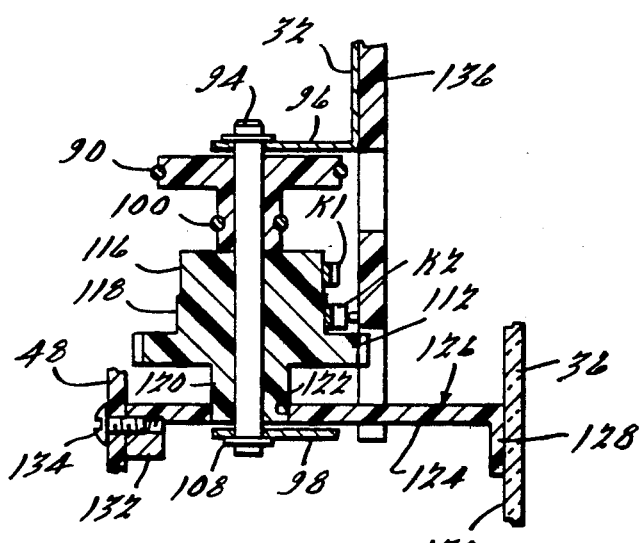

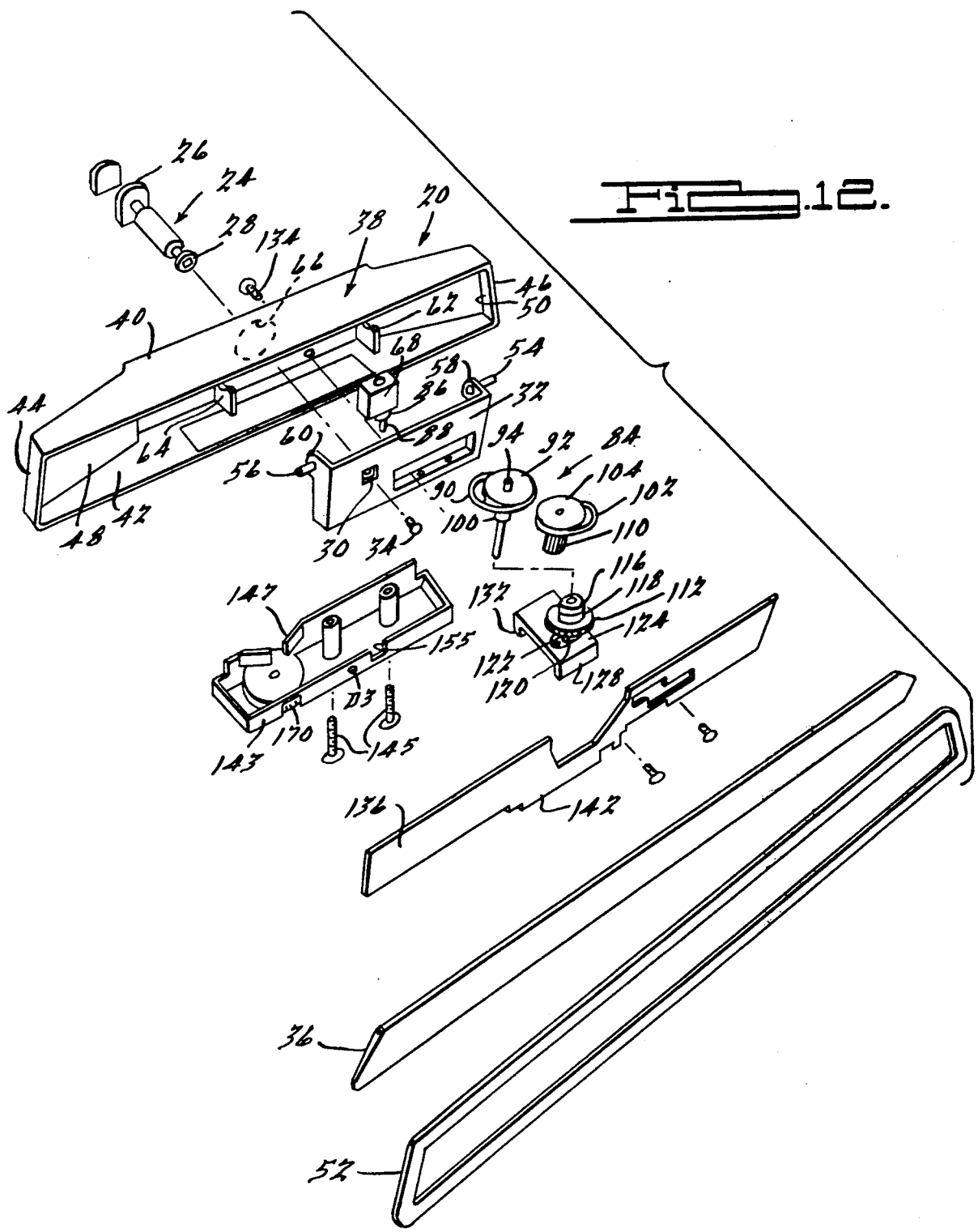

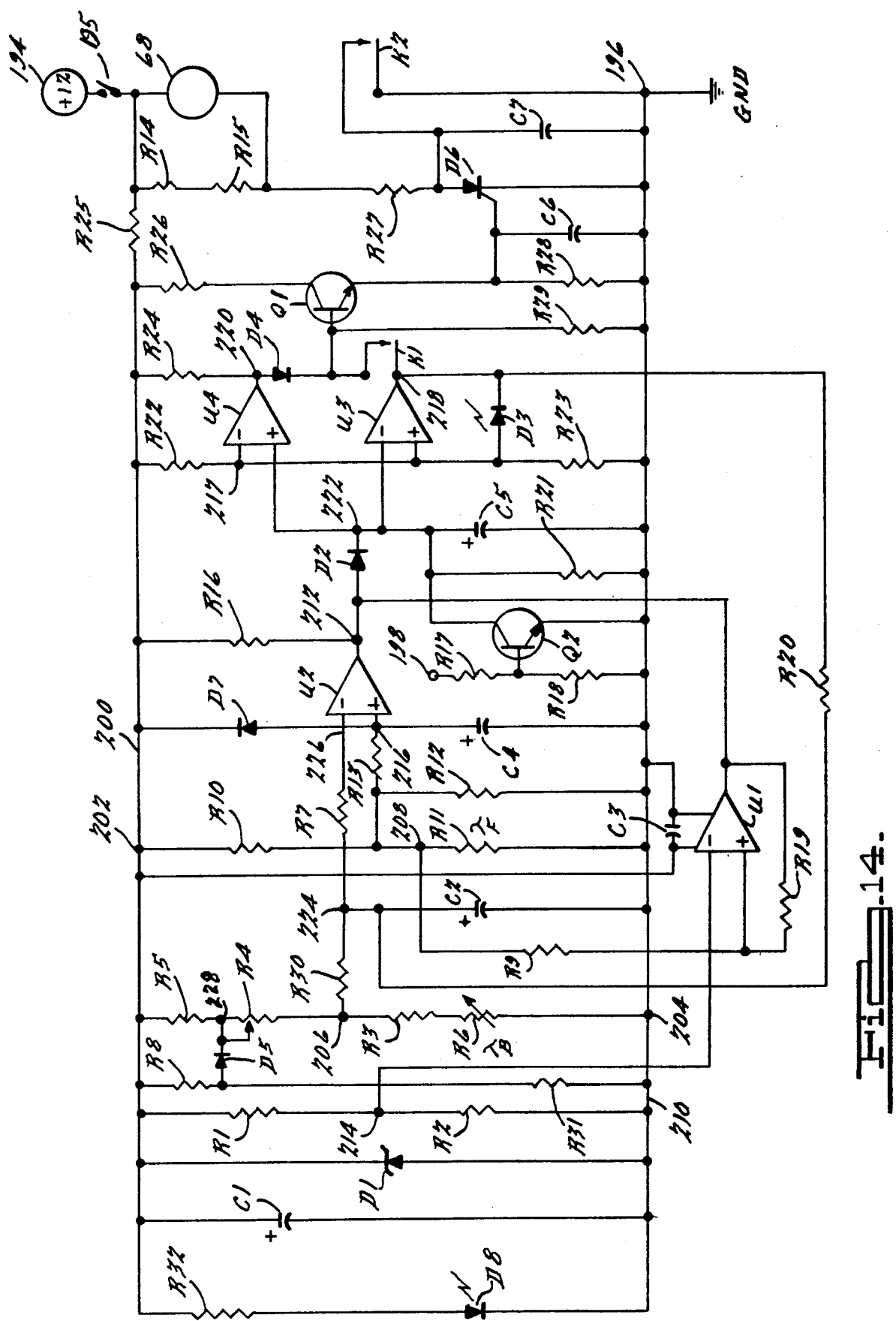

AUTOMATIC REARVIEW MIRROR FOR AUTOMOTIVE VEHICLES

BRIEF SUMMARY OF THE INVENTION

This invention relates to rearview mirrors for automotive vehicles and, more particularly, to an improved inside rearview mirror which is particularly adapted for use with automotive vehicles and which automatically transfers from the full reflectance mode (day) to the partial reflectance mode (night) for glare protection from light emanating from the headlights of vehicles approaching from the rear. Rearview mirrors embodying the present invention utilize a prism type reflective element which is substantially identical to the prism type reflective elements utilized in manually (hand) operated day-night mirrors conventionally provided on modern day automobiles. In general, rearview mirrors embodying the present invention automatically respond to annoying glare from the rear of the vehicle and shift to the partial or low reflectance mode. After the source of the annoying glare is removed, mirrors embodying the present invention automatically return to the full or high reflectance mode without requiring any action on the part of the driver of the vehicle during any portion of the cycle, the power required being drawn either from the vehicle's electrical system or from a self-contained battery.

Heretofore, automatic mirrors have been devised for the purpose of automatically shifting the reflective element incorporated therein between the full reflectance and partial reflectance modes. However, prior automatic mirrors of the indicated character typically have deficiencies that preclude practical application of the devices. For example, many prior automatic mirrors have been unsatisfactory from a practical standpoint because of the means employed to move the reflective element. The most common method of moving the reflective element has been to employ an electric solenoid or electro-magnet as the prime mover in the system, and such devices have several inherent disadvantages. First, they are generally very noisy and difficult to silence. Also, they are usually very heavy and make it difficult to achieve good vibration performance because of their addition to total mirror mass. The problem of high current draw for initial actuation also complicates the design of the photocell circuit required to drive the system. In addition, solenoids and electro-magnets also have low force available in reasonably sized packages and therefore require that only the reflective element be moved and that a weak spring system be utilized to return the reflective element to a rest position. Moreover, because of the low force available, the reflective element tends to be loosely retained and so tends to be very prone to vibration with consequent unsatisfactory performance characteristics. Other prior automatic mirrors have utilized vacuum solenoids, but such vacuum solenoids need to be quite large and also still require a spring return of the reflective element thereby creating a vibration problem. Vacuum solenoids also require a vacuum hose to be routed to the mirror, and such hoses can be quite ungainly and unsightly. Still other prior automatic mirrors have incorporated systems wherein light absorbing fluids are pumped between a cover glass and a reflective surface, but these last mentioned systems have deficiencies in that they have a slow reaction to glare conditions, poor clarity in the full reflectance mode, are subject to leaking of the fluid, and require elaborate and expensive means to pump the fluid in and out of the space between the reflective surface and the cover glass. Liquid crystal devices have also been employed in prior automatic mirrors in an effort to achieve changeable reflectance, and while such devices only require an applied voltage to change the reflectance characteristics, they suffer from low clarity in the high reflectance mode and very poor performance characteristics at low temperatures.

With respect to the means for sensing glare conditions, some prior automatic mirrors incorporate a single rear facing sensor, and the reflective element moves to the antiglare position when a predetermined light level is sensed by the rear facing sensor, while other prior automatic mirrors also employ a second sensor to sense ambient light, the second sensor disabling the unit during daylight hours. Still other prior automatic mirrors utilize a forward facing ambient light sensor to program the sensitivity of the rear facing sensor against the sensed ambient light level, the ambient light sensing being done on an essentially instantaneous basis. Filtering is not introduced in such prior automatic mirrors until after the signals from the forward and rearward facing sensors have been combined. Prior automatic mirrors incorporating only a single rear facing sensor or a second sensor to sense ambient light require readjustment of the threshold levels under practically every change in driving conditions, as for example, from city driving conditions to country driving conditions, while prior automatic mirrors utilizing a forward facing ambient light sensor to program the sensitivity of the rearward facing sensor against the sensed ambient light level do not compensate for the time required for the human eye to respond to a change in ambient light level, with the result that the great short term variation in the ambient light level as seen by the driver of a vehicle from oncoming headlights and overhead streetlights makes operation of such prior automatic mirrors unacceptably erratic under many driving conditions.

An object of the present invention is to overcome the aforementioned as well as disadvantages in prior automatic mirrors of the indicated character and to provide an improved automatic rearview mirror for automotive vehicles, the mirror incorporating improved means responding automatically to annoying glare from the rear of a vehicle to shift a reflective element from a full reflective mode to a partial reflective mode and automatically return the reflective element to a full reflective mode after the source of the glare is removed and without requiring any action on the part of the driver of the vehicle during any portion of the cycle.

Another object of the present invention is to provide an improved rearview mirror for automotive vehicles, which mirror incorporates improved means for detecting and comparing the relative brightness of light forwardly and rearwardly of the vehicle.

Another object of the present invention is to provide an improved automatic rearview mirror which does not require readjustment of the threshold levels due to changes in driving conditions.

Another object of the present invention is to provide an improved automatic rearview mirror incorporating improved means for compensating for the time required for the human eye to respond to changes in ambient light levels.

Another object of the present invention is to provide an improved automatic rearview mirror incorporating improved means for filtering an electrical signal received from a forwardly facing sensor incorporated therein independently of an electrical signal received from a rearwardly facing sensor incorporated therein.

Another object of the present invention is to provide an improved automatic rearview mirror incorporating improved means for moving a reflective element between a full reflectance mode and a partial reflectance mode and which means is relatively light in weight, small in size, low in cost, quiet in operation and free of extraneous movement.

Another object of the present invention is to provide an improved automatic rearview mirror incorporating improved means for automatically moving a reflective element from a full reflectance mode to a partial reflectance mode without the use of electric solenoids, electro-magnets, vacuum solenoids, spring systems, fluid pumps, fluid lines and connections, or liquid crystals.

Another object of the present invention is to provide an improved automatic rear view mirror incorporating improved means for moving a reflective element between a full reflectance mode and a partial reflectance mode with a minimum of electrical power.

Another object of the present invention is to provide an improved automatic rearview mirror incorporating improved means for supporting the components thereof whereby vibration is reduced to a minimum.

Another object of the present invention is to provide an improved automatic rearview mirror that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a perspective view of an automatic rearview mirror embodying the present invention, showing the same installed on the windshield of a vehicle whereby the reflective element of the mirror faces rearwardly of the vehicle in a conventional manner;

FIG. 2 is an elevational view, with portions broken away, of the mirror illustrated in FIG. 1 as it faces the rear of the vehicle;

FIG. 3 is a side elevational view of a portion of the mirror illustrated in FIG. 1;

FIG. 4 is an elevational view of a portion of the mirror illustrated in FIG. 1 as such portion faces the front of the vehicle;

FIG. 5 is a plan view of the bottom of the mirror illustrated in FIG. 1;

FIG. 6 is an elevational view of the mirror illustrated in FIG. 1 as it faces the front of the vehicle, showing the same with the housing removed for clarity of illustration;

FIG. 7 is a cross sectional view of a portion of the structure illustrated in FIG. 6, taken on the line 7—7 thereof;

FIG. 8 is a cross sectional view of a portion of the structure illustrated in FIG. 6, taken on the line 8—8 thereof;

FIG. 9 is a cross sectional view of a portion of the structure illustrated in FIG. 6, taken on the line 9—9 thereof;

FIG. 10 is a cross sectional view of a portion of the structure illustrated in FIG. 6, taken on the line 10—10 thereof;

FIG. 11 is a cross sectional view of a portion of the structure illustrated in FIG. 6, taken on the line 11—11 thereof;

FIG. 12 is a schematic exploded view of certain of the components of the mirror illustrated in FIG. 1;

FIG. 14 is a schematic electrical diagram of the automatic mirror control circuitry embodying the present invention.

DETAILED DESCRIPTION

Figure 13:
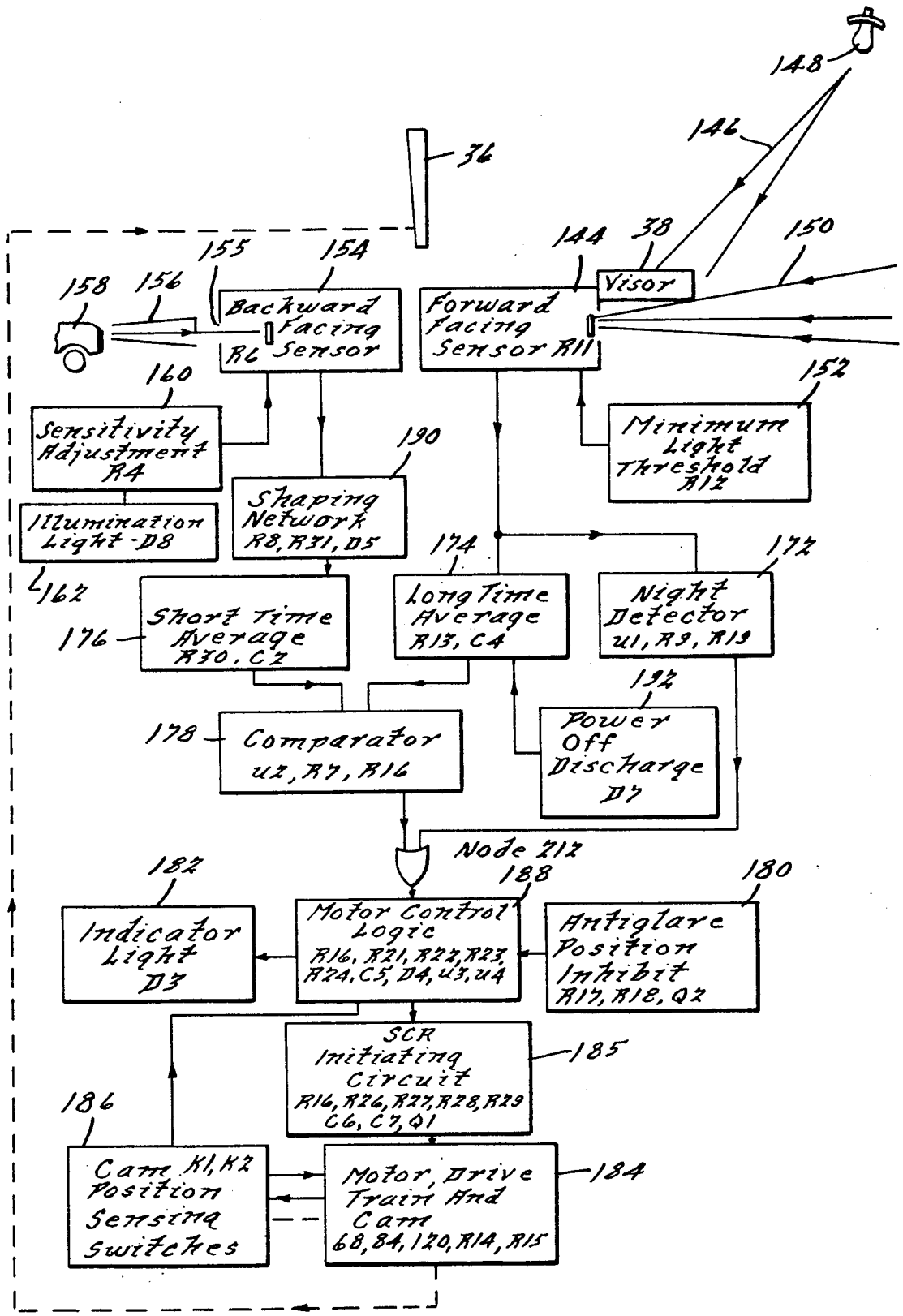
FIG. 13 is a schematic block diagram of the automatic mirror and control circuitry embodying the present invention.

Referring to the drawings, a preferred embodiment of the invention is illustrated therein and is comprised of an automatic rearview mirror, generally designated 20, which is adapted to be mounted on the inside of the windshield 22 of an automotive vehicle through the agency of a conventional mounting member 24 incorporating conventional ball and socket means (not shown) permitting angular adjustment of the mirror in a conventional manner. The outer end portion 26 of the mounting member 24 is fixed, for example by an adhesive, to the windshield 22 while the inner end portion of the mounting member is provided with a non-circular mounting block 28 adapted to be received in a similarly shaped hole 30 provided in a base 32, the base 32 being retained by a screw 34. In the preferred embodiment illustrated, the automatic rearview mirror 20 includes a conventional prism type reflective element 36 which is mounted on a housing 38, the housing having top and bottom walls 40 and 42 integrally joined by side walls 44 and 46 and a rear wall 48 to define a chamber 50 which is open in the direction facing the rear of the vehicle. The prism type reflective element 36 is retained by a grommet 52 fitted over the free edges of the top, bottom and side walls of the housing whereby the reflective element 36 is permanently fixed to the housing 38. The housing 38, in turn, is pivotally connected to the base 32 through the agency of axially aligned trunnions 54 and 56 which are mounted in spaced, outwardly projecting flanges 58 and 60, respectively, provided on the base 32, the trunnions 54 and 56 being supported in bearings 62 and 64, respectively, formed integrally with the back wall of the housing, as shown in FIGS. 6, 11 and 12, whereby the reflective element 36 and the housing 38 may be pivoted as a unit relative to the base 32, the central portion of the mounting member 24 passing through an opening 66 provided in the rear wall 48 of the housing with sufficient clearance to permit the pivotal movement of the reflective element and the housing relative to the mounting member 24 whereby the reflective element may be moved from a full reflective mode to a partial reflective mode and thereafter returned to the full reflective mode by pivoting the reflective element and the housing as a unit about the aligned longitudinal axis of the trunnions 54 and 56.

In accordance with the present invention, a small, unidirectional DC motor 68 is provided as the prime mover for moving the reflective element 36 and the housing 38 between the full reflectance and partial reflectance positions, the motor 68 being mounted on the base 32 through the agency of a mounting bracket 70 which is fixed to the base 32 by any suitable means, the mounting bracket 70 having a pair of leg portions 72 and 74 which support the sides 76 and 78 of the unidirectional DC motor 68. In the embodiment of the invention illustrated, rubber mounting pads 80 and 82 are interposed between the sides of the motor and the leg portions 72 and 74 of the mounting bracket to isolate the motor from the mounting bracket to reduce noise and vibration to a minimum.

A three stage speed reduction, generally designated 84, is provided for the motor 68, such speed reduction being comprised of a drive pulley 86 which is fixed to the drive shaft 88 of the motor 68. By means of an O-ring belt 90, the drive pulley 86 drives a pulley 92 fixed to a shaft 94 supported by outwardly projecting flanges 96 and 98 provided on the base 32, the shaft 94 also carrying a pulley 100 which by means of an 0-ring belt 102 drives a pulley 104 fixed to a shaft 106 also supported by the flanges 96 and 98, the shafts 94 and 106 being retained by any suitable means, such as snap rings 108. The shaft 106 carries a pinion 110 which drives a spur gear 112 mounted on the shaft 94. Integral with the spur gear 112 are switch cams 116 and 118 and an eccentric cam 120 disposed in a passageway 122 defined by the web portion 124 of a generally channel shaped bridge member 126. The bridge member 126 includes a flange portion 128 which is fixed to the inside surface 130 of the reflective element 36 by any suitable means, such as an adhesive. The bridge member 126 also includes a flange portion 132 which is fixed to the wall 48 through the agency of a screw 134. With such a construction, rotation of the eccentric cam 120 causes the eccentric bridge 126 to translate thereby pivoting the reflective element 36 and the housing 38 as a unit about the aligned axes of the trunnions 54 and 56 to move the reflective element 36 between the full reflectance and partial reflectance modes. The switch cams 116 and 118 function to open and close the contacts of limit switches K1 and K2 to start and stop the motor as will be described hereinafter in greater detail, the contacts of the limit switch K1 being closed in the partial reflectance position of the reflective element 36 and open in all other positions of the reflective element. The contacts of the limit switch K2 are open in both the full reflectance position and the partial reflectance position of the reflective element 36 and closed when the reflective element is intermediate such positions.

In the preferred embodiment of the invention illustrated, a printed circuit board 136 is provided which is fixed to the base 32, as with screws 138 and 140, the printed circuit board 136 being disposed within the chamber 50 defined by the housing 38 and carrying various components and electrical conductor paths of the control circuitry embodying the invention as will be described hereinafter in greater detail. In addition, a mounting plate 142 is provided which projects below the bottom wall 42 of the housing so as to be visible to the driver of the vehicle, the mounting plate carrying other components of the control circuitry and being enclosed by a sub-housing 143 fixed to the base 32 as by screws 145.

FIG. 13 illustrates in schematic block diagram form the automatic mirror and control circuitry embodying the present invention and including the prism type reflective element 36, the motor 68, the drive train 84 and the eccentric cam 120 effective to drive the reflective element 36 to the full reflectance and partial reflectance modes, and the cam position sensing switches K1 and K2.

A forward facing sensor 144 is provided in the form of a photoelectric cell R11 which is mounted on the mounting plate 142 and positioned to have a wide angle view through a diverging passageway 147 defined by the sub-housing 143, the forward facing sensor 144 being shielded from light rays 146 emanating from overhead street lights 148 by the housing which acts as a visor. The light rays 150 are representative of the ambient light level to which the driver is exposed. The minimum light threshold 152 in the form of a resistor R12 prevents significant response of the forward sensor 144 to very low forward light levels. A backward facing sensor 154 is provided in the form of a photocell R6 which is also mounted on the mounting plate 142. The backward facing sensor 154 is also protected by the sub-housing 143 so as to restrict ambient light from reaching the photoelectric cell R6 except through the aperature 155 provided in the sub-housing 143 but to allow light rays 156 emanating from the headlights of a following vehicle 158 to be sensed through the aperature 155. A sensitivity adjustment 160 in the form of a potentiometer R4 is provided which controls the sensitivity of the photoelectric cell R6 while an illumination light 162 in the form of a light emitting diode D8 is positioned to illuminate the dial 170 provided for adjusting the resistance of the sensitivity adjustment potentiometer R4. The light emitting diode D8 is lighted whenever the mirror circuit is energized which is normally whenever the vehicle ignition is turned on. The night detector 172 comprising a comparator U1 and resistors R9 and R19 holds the reflective element 36 in its high reflectance state when the light reaching the forward sensor 144 exceeds a predetermined level but allows the automatic mirror to operate at night. The time averaging circuit 174 comprising the resistor R13 and the capacitor C4 responds to the signal from the forward sensor 144 in a way which approximates the time response of the human eye to changing light levels and also smoothes what is normally a very active signal from the forward facing sensor 144.

In the embodiment of the invention illustrated, a time averaging circuit 176 is provided, comprising a resistor R30 and a capacitor C2, which is of much faster response than the time averaging circuit 174 so as to filter the signal from the rearward facing sensor 154. The comparator circuit 178 comprising a comparator U2 and resistors R7 and R16 is triggered when the rearward light level is high in relation to the time averaging of the forward light level. With the comparator 178 triggered, the reflective element will move to the antiglare position only if the detector 172 indicates a night condition and the signal from an antiglare position inhibitor 180 does not inhibit motion to the antiglare position as will also be described hereinafter in greater detail. The antiglare position inhibitor is provided to prevent the reflective element from moving to the low reflectance state at undesirable times such as when the vehicle is in reverse gear.

The indicator light 182 in the form of a light emitting diode D3 alerts the driver of the vehicle that the reflective element 36 is in the antiglare position, this feature being provided so that the driver of the vehicle will not confuse the subdued image of a closely following vehicle with a distant image when the reflective element is in the partial reflectance position.

The unidirectionally driven DC motor 68, drive train 84 and eccentric mirror positioning cam 120 are depicted by the block 184. Motor rotation is initiated by a momentary turn-on of the silicon controlled rectifier initiating circuit 185 whenever a *change* in reflective state is required. The cam positioning switches K1 and K2 depicted in the box 186 commutate the silicon controlled rectifier, cause the motor 68 to run until a proper cam position is reached, and indicate the reflective position of the reflective element 36 to the control logic. The control logic 188 combines the inputs from the comparator 178 and the night detector 172, the inhibitor 180 and the cam position indication switches K1 and K2 to determine when to send a trigger pulse to the SCR initiating circuit 185. In the embodiment of the invention illustrated, a logic condition requiring that the reflective element 36 transfer to the partial reflectance mode must be present for about one-third second before a trigger pulse is generated. An input logic condition requiring that the reflective element 36 traverse to the full reflectance mode must be present for about nine seconds before the trigger pulse is generated.

In the embodiment of the invention illustrated, a shaping network 190 is provided which makes the mirror less sensitive in high ambient light situations, particularly for low resistance (low sensitivity) settings of the sensitivity adjustment 160 (potentiometer R4) as will be described hereinafter in greater detail. A power off discharge 192 is also provided to prevent the reflective element from traversing to the partial reflectance mode if the vehicle's ignition is turned off for a relatively short time.

Referring to FIG. 14, the circuitry embodying the present invention is illustrated therein, the circuit being energized by a positive voltage at the terminal 194, which voltage may be supplied by the vehicle electrical system or by a self contained battery through an on-off switch 195. The terminal 196 is connected to the electrical system ground. The terminal 198 is energized by a positive voltage which may be supplied by the circuitry which causes the backup lights of the vehicle to be energized when the vehicle is in reverse gear. Positive voltage supplied to the terminal 198 locks the reflective element 36 out of the partial reflectance mode when the vehicle is in reverse gear to insure that the reflective element is always in the full reflectance position during backing up procedures. The circuitry also includes the unidirectional DC motor 68, the switches K1 and K2, the light emitting diodes D3 and D8, a Zenner diode D1, diodes D2, D4, D5, and D7, a silicon controlled rectifier D6, comparators U1, U2, U3 and U4, transistors Q1 and Q2, capacitors C1 through C7, the photoelectric cells R6 and R11, the potentiometer R4, and resistors R1 through R3, R5, R7 through R10, and R12 through R32, such components all being electrically connected by suitable conductors as illustrated in the drawings and as will be described hereinafter in greater detail.

The resistor R25 limits current from over voltage and from a wrong polarity applied to the terminal 194. The Zenner diode D1 clamps over voltage levels, both positive and negative, to levels which will not harm the circuit components while the capacitors C1 and C3 filter the supply voltage on the circuit supply bus 200.

The forward light sensor R11 and the rearward light sensor R6 are photo resistive having lower resistance at higher incident light levels. The photocells R6 and R11 are preferably matched so that calibration will not vary significantly from one circuit to the next and so that temperature effects will be largely cancelled. The resistor R10 and the series resistors R4 and R5 are included with the photo resistors R6 and R11 to form a wheatstone bridge which is energized from the nodes 202 and 204, the potentiometer R4 being the sensitivity adjustment. With a higher resistance setting of the potentiometer R4, the circuit responds to a higher resistance (lower light level) on the rear facing sensor R6 thereby increasing the sensitivity of the circuit.

Since the sensors R6 and R11 independently receive energy from the supply line 200, the voltage at the node 206, which decreases with increasing light from the rear, and the voltage at the node 208, which decreases with increasing light from the front, are essentially independent. The quad comparator comprising the comparators U1, U2, U3 and U4 is supplied from the bus 200 and has open collector outputs which conduct to the bus 210 in the zero or low output state and which are open or non-conducting in the one or high state.

The node 212 is held low by the comparator U1 or the comparator U2 to keep the reflective element 36 in the fully reflective mode. With the inhibit terminal 198 not energized and with the comparators U1 and U3 high, the capacitor C5 charges through the resistor R16 and the diode D2 causing the output of the comparator U3 to go low and the output of the comparator U4 to go high. This causes the reflective element 36 to traverse to the partial reflectance mode.

As previously mentioned, the unidirectional DC motor 68 rotates the eccentric cam 120 through the three stage speed reduction 84 to move the reflective element 36 between its reflective positions. The contacts of the switch K1 are open when the reflective element 36 is in its fully reflective mode and closed when the reflective element 36 is in the partially reflective mode. The contacts of the switch K2 are closed except when the reflective element 36 is in each of its two stable positions. The silicon controlled rectifier D6 receives gate current from the transistor Q1 to initiate movement from one reflective state to the other. The gate signal is controlled by the position of the contacts of the switch K1 and the state of the comparators U3 and U4. The gate signal is removed during traverse of the mirror to the required position. The contacts of the switch K2 short the silicon controlled rectifier D6 causing the silicon controlled rectifier D6 to revert to its blocking state as soon as the gate signal is removed. The contacts of the switch K2 open and deenergize the motor 68 when the reflective element 36 is positioned in its desired reflective state.

The comparator U1 compares the unfiltered signal at the node 208 against the reference level established at the node 214. The comparator U1 turns on to hold the reflective element 36 in the fully reflective mode when the forward light level is roughly three foot candles or higher. The resistor R19 provides positive feedback which in combination with the resistor R9 makes the comparator U1 bistable. The resistor R9 is much higher in resistance than the photocell R11 at the threshold point of the comparator U1 and thus serves to approximately match the input impedences at the inputs of the comparator U1.

At forward light levels above 0.1 foot candle, the forward sensed and the time average of the rear sensed light level are compared in almost strict ratiometric fashion. The resistor R12 is in parallel with the forward sensor, and as the forward light level falls below 0.1 foot candle, the conductivity of the resistor R12 becomes increasingly significant in relation to the decreasing conductivity of the forward facing cell R11. The effect is that at forward light levels ranging from 0.1 foot candle to 0.02 foot candles, the voltage at the node 208 does not increase so rapidly with decreasing light level and remains nearly constant for forward light levels below 0.002 foot candles. This establishes a maximum voltage reference level and a corresponding minimum rearward sensed light level to which the comparator will respond. In practical terms, some low light level in the range of 0.001 to 0.02 foot candles does not bother the normal human eye even with very low levels of forward illumination.

For decreasing forward light levels, the circuit makes a transition from the ratiometric mode in which the light level sensed from the rear is compared against the time average of the forward sensed light level to an absolute mode. In the absolute mode active for very low forward light levels, the rearward sensed light level is compared against a minimum threshold. This minimum threshold is still affected by sensitivity adjustment of the potentiometer R4.

The resistor R13 and the capacitor C4 form a 22 second RC time constant which averages the "instantaneous" forward light level indicated by the voltage at the node 208 to form a new average reference level at the node 216, and the rearward light level is compared against the reference level at the node 216.

Bright light impinging on the rear sensor R6 decreases the resistance of R6 reducing the voltage at the node 206 until it falls below the voltage at the node 208. The comparator U2 then turns off and provided that the daylight comparator U1 is off and that the inhibit terminal 198 is not energized, the capacitor C5 charges through the resistor R16 and the diode D2, the charging time constant being about one-third second. When the voltage at the node 222 exceeds the voltage at the node 217 established by the voltage divider R22-R23, the output 218 of the comparator U3 is turned on and the output 220 of the comparator U4 is turned off. The light emitting diode D3 is then turned on by current drawn through the resistor R22. The voltage at the node 218 is almost zero and the forward voltage drop across the light emitting diode D3 is a little over one volt. Thus the voltage at the node 216 is one to one and one-half volts. The diode D2 blocks reverse current from the node 222 to the node 212 when the comparators U1 or U2 turn on. The capacitor C5 must discharge through the resistor R21 until the voltage at the node 222 falls to the one to one and one-half volt level matching the voltage at the node 216. This requires about nine seconds and the mirror reverts to the fully reflective mode at this time. The circuit acts as a retriggerable one shot which requires one-fifth to one-half second to trigger (which may be adjusted by changing the values of the resistor R16 and/or the capacitor C5) and will hold the reflective element 36 in the flip position for about nine seconds (adjustable by changing the values of the resistor R21 or the capacitor C5) after light on the rear sensor R6 has fallen below the reference level. The above prevents unreasonably fast cycling of the reflective element 36 since the total cycle from reflective to anti-reflective and back requires about nine seconds. When the terminal 198 is energized, current flows through the resistor R17 turning on the transistor Q2 and discharging the capacitor C5 to hold the mirror in or rapidly return it to the fully reflective position. The resistor R18 prevents leaking current from turning on the transistor Q2.

The sequence of the motor control circuit is as follows: In the fully reflective position of the reflective element 36, the node 218 is high, the node 220 is low, and the contacts of the switches K1 and K2 are open. A command to go to the partial reflectance position causes the node 220 to go high and the node 218 to go low. Current then flows through the resistor R24 and diode D4 to the base of the transistor Q1. The transistor Q1 then conducts supplying current from the resistor R26 to the gate of the silicon controlled rectifier D6. The silicon controlled rectifier D6 then turns on and energizes the motor 68 through the resistor R27. The motor 68 then moves the eccentric cam 120 to move the reflective element 36 out of the fully reflective mode. The contacts of the switch K2 then close and later the contacts of the switch K1 close, thereby turning off the transistor Q1. The silicon controlled rectifier D6 turns off because both the anode and gate currents are removed. The contacts of the switch K2 open when the partially reflective position of the reflective element 36 is reached, and the circuit remains stable until a command to return to the fully reflective position is received.

In the partial reflective mode, the contacts of the switch K2 are open, the contacts of the switch K1 are closed, the node 220 is high and the node 218 is low. A command to return to the fully reflective position causes the node 220 to go low and the node 218 to go high. Current then flows through the resistor R22, the light emitting diode D3, and the contacts of the switch K1 to the base of the transistor Q1. The transistor Q1 then turns on, turning on the silicon controlled rectifier D6, and the motor 68 moves the reflective element 36 away from the partial reflectance position causing the contacts of the switch K2 to close and later causing the contacts of the switch K1 to open thereby removing base current from the transistor Q1. The silicon controlled recitifer D6 then has gate and anode current removed and turns off. The contacts of the switch K2 open when the reflective element 36 reaches its fully reflective position.

The capacitor C6 prevents noise from triggering the silicon controlled rectifier D6. The capacitor C7 is a snubbing capacitor for the silicon controlled rectifier D6 while the resistors R14 and R15 suppress inductive transients from the motor 68. The resistors R28 and R29 conduct leakage current away from the silicon controlled rectifier D6 and the transistor Q1. The resistor R20 provides positive feedback to cause bistable switching of the comparator U2.

The resistors R14 and R15 are preferably formed of high temperature coefficient wire and are preferably spaced apart on the circuit board to distribute heat in the event that they are continuously energized. The resistors R14 and R15 which are in parallel with the motor 68 improve braking action and reduce coast.

It has been found that light levels both forwardly and rearwardly of the vehicle and under practically all driving conditions are quite erratic. The time constant at the node 224 is the product of the capacitor C2 and the sum of the resistance of R30 and the source resistance of the rear facing sensor circuit at the node 206. The resistance at the node 206 decreases and the resistance of the photocell R6 decreases due to increased light levels. The resistor R30 maintains a time constant of about 0.27 seconds even in high light level situations. The time constant is considerably longer when the resistance of the photocell R6 is high in low light level situations. This minimizes the tendency of lights along the side of a dimly lighted road to actuate the antiglare circuit.

The signal at the node 216 is the time average of the light level sensed in the forward direction. The voltage at the node 216 decreases with increasing ambient light levels. The effect is to reduce the sensitivity of the circuit to rearward sensed light levels by more than 30 to 1 as the average ambient light varies from low to high levels. Since most drivers prefer the circuit to respond only to misaimed headlights in high ambient light city driving conditions, the resistors R8 and R31 and the diode D5 decrease the sensitivity of the circuit in high ambient light situations. The effect is much more pronounced for low sensitivity (low resistance) setting of the potentiometer R4. The voltage at the node 226 must be as low as or lower than the voltage at the node 216 to cause the mirror to move to the antiglare position.

With low levels at the node 226, the voltage at the node 206 is low. For relatively low resistance settings of R4, the voltage at the node 228 is also low and the diode D5 is forward biased. Current flowing through the resistor R8, the diode D5, the potentiometer R4, the resistor R3 and the photocell R6 increases the voltage at the node 206. A higher light level from the back must further reduce the resistance of the rear sensor R6 to lower the voltage at the node 206 and offset the effect of the shaping circuit. This results in reduced sensitivity of the circuit.

Current through the resistor R3 increases at high light levels. The voltage drop across the resistor R3 increases the voltage at the node 206 also tending to reduce the sensitivity of the circuit. The diode D5, resistor R8 and resistor R31 act mainly when the potentiometer R4 is in a low sensitivity (low resistance) range. With such a construction, drivers desiring low sensitivity in the city can adjust the sensitivity to a lower range setting. Drivers desiring more sensitivity in the city still have such sensitivity because a large resistance value of the potentiometer R4 raises the voltage at the node 228 tending not to forward bias the diode D5 and minimizing or entirely preventing current from flowing through the diode D5 even in high light level conditions.

The resistor R3 acts almost independently of the circuit above described and either the resistor R3 or the circuit above described may be used without the other. The voltage across the resistor R3 is significant compared to the voltage across the photosensor R6 only when the resistance of R6 is low, that is when light levels are high. The resistor R3 decreases the sensitivity of the unit in high light levels for all sensitivity settings. The resistor R3 also minimizes nuisance actuation of the circuit at dawn and dusk.

Without the diode D7, the capacitor C4 would tend to retain a charge for an appreciable time after the circuit is deenergized when the ignition is turned off. If the ignition is turned back on within a short time, there would be a tendency for the voltage on the capacitor C4 to cause the element 36 to traverse to the antiglare position. However, when the capacitor C4 is discharged, there is the desirable reverse tendecy to hold the reflective element 36 out of the antiglare position for several seconds after the ignition is turned on and until the capacitor C4 charges. The diode D7 is reversed biased during power on and has no effect on the circuit. However, during power down, the diode D7 conducts thereby discharging the capacitor C4 so that the reflective element 36 will not traverse to the antiglare position if the ignition is turned off and on in a relatively short time.

Typical values for the components of the circuitry described hereinabove are as follows:

| | |
|---|---|
| R1 | 2.2 M ohm |
| R2 | 100 K ohm |
| R3 | 8.2 K ohm |
| R4 | 1 M ohm - Carbon Potentiometer |
| R5 | 270 K ohm |
| R6 | Photocell |
| R7 | 390 K ohm |
| R8 | 47 K ohm |
| R9 | 100 K ohm |
| R10 | 220 K ohm |
| R11 | Photocell |
| R12 | 390 K ohm |
| R13 | 470 K |
| R14 | 15 ohm - Nickel-Iron |
| R15 | 15 ohm - Nickel-Iron |
| R16 | 33 K ohm |
| R17 | 27 K ohm |
| R18 | 4.7 K ohm |
| R19 | 6.8 M ohm |
| R20 | 6.8 M ohm |
| R21 | 430 K ohm |
| R22 | 10 K ohm |
| R23 | 22 K ohm |
| R24 | 100 K ohm |
| R25 | 330 ohm |
| R26 | 4.7 K ohm |
| R27 | 3.9 ohm |
| R28 | 1 K ohm |
| R29 | 47 K ohm |
| R30 | 82 K ohm |
| R31 | 150 K ohm |
| R32 | 470 ohm |
| C1 | 22 MFD, 16 V |
| C2 | 3.3 MFD, 16 V |
| C3 | .022 MFD |
| C4 | 47 MFD, 10 V |
| C5 | 10 MFD, 16 V |
| C6 | 47 MFD, 10 V |
| C7 | .047 MFD |
| D1 | IN4745, Zener Diode |
| D2 | IN4148 |
| D3 | Light Emitting Diode |
| D4 | IN4148 |
| D5 | IN4148 |
| D6 | C203D, Silicon Controlled Rectifier |
| D7 | IN4148 |
| D8 | Light Emitting Diode |
| U1 | ¼LM2901, Comparator |
| U2 | ¼LM2901, Comparator |
| U3 | ¼LM2901, Comparator |
| U4 | ¼LM2901, Comparator |
| Q1 | 2N3904, Transistor |
| Q2 | 2N3904, Transistor |

In the operation of the mirror 20, upon entering the vehicle, the driver should adjust the reflective element 36 for good rearward vision and adjust the potentiometer R4 through the agency of the dial 170 to the desired setting. Such setting may be adjusted to suit the preferences of the driver. Then, when the headlights of a vehicle approaching from the rear tend to cause annoying glare, the photocell circuit will signal the reflective element to move to the antiglare position and the following chain of events will take place. The motor 68 is energized and begins rotating to drive the three stage speed reduction 84 to rotate the eccentric cam 120 which causes the eccentric bridge 126 to translate, thereby moving the reflective element 36 and the mirror housing 38 as a unit to the antiglare position. The contacts of the switch K2 open and deenergize the motor 68 when the reflective element 36 is positioned in the desired antiglare position. The reflective element 36 is held securely in the antiglare position until the source of the glare is removed. When the source of the glare is removed, the circuitry will signal the motor 68 to reinitiate rotation, again driving the three stage speed reduction 84 to cause the switch cams and the eccentric cam to rotate, thereby closing the limit switch K2 and also moving the reflective element 36 through the agency of the eccentric bridge to return the reflective element to the full reflective mode. At this point, the limit switch K2 opens and the cycle is completed. The reflective element 36 will then be held securely in the full reflectance mode until another source of annoying glare is encountered, whereupon the cycle will be repeated.

From the foregoing it will be appreciated that the present invention enables the use of a small, very low cost unidirectional DC motor as the prime mover for the reflectance element. The use of a unidirectional DC motor driving through a combination belt drive and gear drive system makes it possible to have high force available to move the reflectance element because several revolutions of the motor can be utilized to do the work. The small motor that can be utilized is significantly lighter in weight than a solenoid. Moreover, the small motor and drive train embodying the present invention allows the total mirror package to be similar to a standard day-night mirror in overall size. Because of the high force available, the reflective element can be permanently fixed to the mirror housing and the reflective element and the housing moved as a unit to shift from a full reflectance mode to a partial reflectance mode and back again whereby a distinct advantage in controlling vibrations is obtained. Moreover, no return spring system is required, so the entire system is tight and free of extraneous movement which would contribute to vibration problems. The belt drive in the first two stages of the speed reduction unit 84 acts to silence the operation of the mirror 20, thereby making it quieter than solenoid operated devices. (It is preferred that the O-rings in the first two stages of the speed reduction unit 84 be made of silicone rubbber since such rubber is resistant to high temperatures and retains its flexibility at very low temeratures.) The third stage of the speed reduction unit 84 is a low cost pinion and spur gear arrangement with the result that the speed reduction system is very quiet and can be produced at low cost.

The circuitry utilized in detecting light levels is self-compensating for ambient light levels and will detect the relative brightness in the forward direction and use this information to establish the level of glare that will cause the reflective element 36 to change to the partial reflectance position. Time averaging is used in the circuitry to control the rate at which the mirror will change from full reflectance to partial reflectance and back again, thereby eliminating nuisance operations.

The mounting of the reflective element permanently on the mirror housing and moving the reflective element and the housing as a unit reduces vibration to a minimum, and the reflective element and the housing are firmly held in both the full reflectance and partial reflectance positions. The limit switches that control the end positions of the mirror cycle are operated from the switch cams so that the final positions are closely controlled.

As previously mentioned, the circuitry is equipped with a driver adjustable control dial 170 that allows the glare level at which the reflective element will cycle to be individually tailored to the eye sensitivity of the driver, the light emitting diode D8 lighting the dial to facilitate such adjustment. In addition, the light emitting diode D3 is energized to show that the reflective element is in the antiglare mode and also serves to warn that a vehicle is following closely. In addition, the control circuitry also provides a reverse lock-out feature that insures that the reflective element is always in the full reflectance mode during backing up procedures.

While a preferred embodiment of the invention has been illustrated and described, it will be understood that various changes and modifications may be made without departing from the spirit of the invention.

What is claimed is:

1. In a rearview mirror for an automotive vehicle, the combination including a reflective element having a full reflectance mode and a partial reflectance mode, forward facing sensor means effective to detect light forwardly of the vehicle and generate a corresponding forward electrical signal indicative of the forward light level, backward facing sensor means effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, a rearward circuit having an input connected to said backward facing sensor means and an output, and means operable to change said reflective element between said full reflectance mode and said partial reflectance mode as a function of the output of said rearward circuit and filtered forward electrical signal, the functional time response provided by said forward sensor filtering means being slower than the functional time response provided by said rearward circuit.

2. The combination as set forth in claim 1 including means controlling the sensitivity of said backward facing sensor means.

3. The combination as set forth in claim 2 including means illuminating said means for controlling the sensitivity of said backward facing sensor means.

4. The combination as set forth in claim 1 said rearward circuit including backward sensor filtering means characterized by having a second time response shorter than the first time response of said forward sensor filter means and having a smoothing time averaging effect on the rearward electrical signal to produce a filtered rearward electrical signal independent of the filtered forward electrical signal.

5. The combination as set forth in claim 1 including means effective to hold said reflective element in its full reflectance mode when the light detected by said forward facing sensor means exceeds a predetermined value.

6. The combination as set forth in claim 1 including means preventing significant response to the forward electrical signal generated by said forward facing sensor means when the light detected by said forward facing sensor means is below a predetermined value.

7. The combination as set forth in claim 1 wherein said means operable to change said reflective element between said full reflectance mode and said partial reflectance mode includes unidirectional rotatable DC motor means.

8. The combination as set forth in claim 1 including means indicating the mode of said reflective element.

9. The combination as set forth in claim 1 including first indicator means operable when said reflective element is in its partial reflectance mode.

10. The combination as set forth in claim 1 including means decreasing the sensitivity of said backward facing sensor means when the ambient light exceeds a predetermined value.

11. The combination as set forth in claim 1 including means inhibiting change of said reflective element between said full reflectance mode and said partial reflectance mode when the vehicle is in reverse gear.

12. The combination as set forth in claim 1 including power switch means, and means preventing said reflective element from changing to its partial reflectance mode when said power switch means is momentarily opened and closed.

13. The combination as set forth in claim 1 including means shielding said forward facing sensor means from light emanating from predetermined directions.

14. The combination as set forth in claim 1 including means shielding said backward facing sensor means from light emanating from predetermined directions.

15. In a rearview mirror for an automotive vehicle, the combination including a reflective element having a full reflectance mode and a partial reflectance mode, first photoelectric sensor means effective to detect light forwardly of the vehicle and generate a corresponding forward electrical signal indicative of the forward light level, second photoelectric sensor means effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, a rearward circuit having an input connected to said second sensor means and an output, comparator means comparing the output of said rearward circuit and the filtered forward electrical signal, rotatable DC motor means operable upon multiple revolutions thereof to move said reflective element between said full reflectance mode and said partial reflectance mode, and means controlling the energization of said motor means and controlled by said comparator means whereby said reflective element may be moved between its full reflectance mode and its partial reflectance mode as a function of the output of said rearward circuit and the filtered forward electrical signal, the functional time response provided by said first sensor filtering means being slower than the functional time response provided by said rearward circuit.

16. The combination as set forth in claim 15 including means for manually adjusting the sensitivity of said second photoelectric sensor means.

17. The combination as set forth in claim 16 including means for decreasing the sensitivity of said second photoelectric sensor means when the ambient light exceeds a predetermined value.

18. The combination as set forth in claim 17, said rearward circuit including backward sensor filtering means characterized by having a second time response shorter than the first time response of said first forward sensor filter means and having a smoothing time averaging effect on the rearward electrical signal to produce a filtered rearward electrical signal independent of the filtered forward electrical signal.

19. The combination as set forth in claim 17 including resistance means preventing significant response to said first photoelectric sensor means when the light detected by said first photoelectric sensor means is below a predetermined value.

20. The combination as set forth in claim 16 including means illuminating said means for manually adjusting the sensitivity of said second photoelectric sensor means.

21. The combination as set forth in claim 15 including means effective to move said reflective element to its full reflectance mode when the light detected by said first photoelectric sensor means exceeds a predetermined value.

22. The combination as set forth in claim 15 including switch means effective to indicate the mode of said reflective element.

23. The combination as set forth in claim 15 including indicator light means energized only when said reflective element is in its partial reflectance mode.

24. The combination as set forth in claim 23 including means decreasing the sensitivity of said second photoelectric sensor means when the ambient light exceeds a predetermined value.

25. The combination as set forth in claim 15 including means effective to move said reflective element to its full reflectance mode when said vehicle is in reverse gear.

26. The combination as set forth in claim 15 including power switch means, and means preventing said reflective element from moving to its partial reflectance mode when said power switch means is momentarily opened and closed.

27. The combination as set forth in claim 15 including speed reduction means connected between said motor means and said reflective element.

28. The combination as set forth in claim 15, said means controlling the energization of said motor means including a silicon controlled rectifier able to withstand harsh transients and having an anode and a cathode connected in series with said motor control means, and switch means connected in parallel with said anode and said cathode to commutate said silicon controlled rectifier.

29. The combination as set forth in claim 15 including means mechanically shielding said first and second photoelectric means from light emanating from predetermined directions.

30. The combination as set forth in claim 27 including eccentric cam means driven by said speed reduction means and effective to translate said reflective element between its full reflectance mode and its partial reflectance mode.

31. In a rearview mirror for an automotive vehicle, the combination including a reflective element having a full reflectance mode and a partial reflectance mode, a housing defining a chamber open in the direction facing the rear of the vehicle, a base disposed at least partially within the chamber defined by said housing, means fixing said reflective element to said housing, means pivotally connecting said housing to said base whereby said reflective element and said housing may be moved as a unit between the full reflectance mode and the partial reflectance mode of said reflective element, and means including rotatable DC motor means operable upon multiple revolutions thereof to pivot said housing and reflective element as a unit between said modes relative to said base.

32. The combination as set forth in claim 31 including speed reduction means operatively connected to said rotatable DC motor means.

33. The combination as set forth in claim 32, said speed reduction means including noise reduction means comprising belt and pulley means.

34. The combination as set forth in claim 31 including eccentric means driven by said rotatable DC motor means and effective to translate said reflective element and said housing and pivot said reflective element and said housing relative to said base.

35. The combination as set forth in claim 31, said reflective element being in the form of a prism.

36. The combination as set forth in claim 31 including indicator means carried by said base and operable when said reflective element is in its partial reflectance mode.

37. In a rearview mirror for an automotive vehicle, the combination including a reflective element in the form of a prism and having a full reflectance mode and a partial reflectance mode, a housing defining a chamber, a base partially disposed within the chamber defined by said housing, means fixing said reflective element to said housing whereby said reflective element faces the rear of the vehicle, means pivotally connecting said housing to said base whereby said reflective element and said housing may be moved as a unit between the full reflectance mode and the partial reflectance mode of said reflective element, first photoelectric sensor means carried by said base and effective to detect light forwardly of the vehicle and generate a corresponding forward electrical signal indicative of the forward light level, second photoelectric sensor means carried by said base and effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, a rearward circuit having an input connected to said second sensor means and an output, means effective to compare the output of said rearward circuit and the filtered forward electrical signal, and means including rotatable DC motor means mounted on said base and operable to pivot said reflective element and said housing as a unit relative to said base as a function of the comparison of the output of said rearward circuit and the filtered forward electrical signal, the functional time response provided by said first sensor filtering means being slower than the functional time response provided by said rearward circuit.

38. The combination as set forth in claim 37 including speed reduction means operatively connected to said rotatable DC motor means, and eccentric means driven by said speed reduction means and effective to translate said reflective element and said housing and pivot said reflective element and said housing as a unit relative to said base while said first and second photoelectric sensor means remain stationary.

39. The combination as set forth in claim 38 including switch means controlling the energization of said rotatable DC motor means as a function of the mode of said reflective element.

40. The combination as set forth in claim 38, said speed reduction means comprising three stages, two of said stages including noise reduction means comprising belt and pulley means driven by said DC motor, the third stage of said speed reduction means comprising pinion and gear means driven by said belt and pulley means, said eccentric means being driven by said gear means.

41. The combination as set forth in claim 37 including means mechanically shielding said first and second photoelectric sensor means from light emanating from predetermined directions.

42. The combination as set forth in claim 41 including indicating means carried by said base and operable when said reflective element is in its partial reflective mode.

43. The combination as set forth in claim 37 including resistance means connected in parallel with said DC motor means and effective to provide a braking action on said DC motor means when said DC motor means is deenergized.

44. The combination as set forth in claim 37 including a silicon controlled rectifier able to withstand harsh transients and having an anode and a cathode connected in series with said DC motor means, and switch means connected in parallel with said anode and said cathode to commutate said silicon controlled rectifier.

* * * * *